United States Patent [19]

Ikins

[11] 4,175,156
[45] Nov. 20, 1979

[54] COMPOSITE FILM ADHESIVE

[75] Inventor: Thomas G. Ikins, Battle Creek, Mich.

[73] Assignee: USM Corporation, Farmington, Conn.

[21] Appl. No.: 907,663

[22] Filed: May 19, 1978

[51] Int. Cl.$^2$ .................. B32B 27/40; B32B 27/36; B32B 27/30

[52] U.S. Cl. .................. 428/336; 428/339; 428/349; 428/352; 428/354; 428/355; 428/414; 428/420; 428/425; 428/480

[58] Field of Search .............. 428/425, 420, 335, 336, 428/339, 414, 343, 347, 349, 352, 354, 355, 480, 914

[56] References Cited

U.S. PATENT DOCUMENTS

| | | | |
|---|---|---|---|
| 2,891,876 | 6/1959 | Brown et al. | 428/425 X |
| 3,177,090 | 4/1965 | Bayes et al. | 428/414 |
| 3,238,087 | 3/1966 | Norwalk et al. | 428/418 X |
| 3,516,904 | 6/1970 | Klinker | 428/336 X |
| 3,903,351 | 9/1975 | Ando et al. | 428/425 |
| 3,911,196 | 10/1975 | Navidad | 428/425 |
| 4,135,033 | 1/1979 | Lawton | 428/352 X |

Primary Examiner—Harold Ansher
Attorney, Agent, or Firm—Benjamin C. Pollard; Richard B. Megley; Vincent A. White

[57] ABSTRACT

Composite film adhesive including a layer of resin adhesive which is heat activatable for adhesion to plasticized resin and which is resistant to plasticizer migrating from the resin and a layer of phenoxy resin which is in strongly adhesive, overall engagement with the heat activatable resin and has active hydrogens for reaction with free NCO groups of a urethane adhesive to enable strong bonding of the phenoxy resin layer by the urethane adhesive.

14 Claims, 4 Drawing Figures

COMPOSITE FILM ADHESIVE

FIELD OF THE INVENTION

This invention relates to a composite adhesive film useful in joining a plasticized resin molding to another surface.

BACKGROUND OF THE INVENTION

Ornamentation such as "body molding" on automobiles presents the problem of securing a strip of plastic, e.g., a vinyl resin such as polyvinyl chloride to the painted surface of an auto body. The shocks to which such molding is subjected require that a strong adhesive bond be established between the molding and the painted surface. Urethane adhesives have many valuable properties for this use particularly strength, flexibility and low "cut growth" values. However, it has been found that the plasticizer content of the vinyl resin migrates toward the polyurethane and against the interface between the vinyl resin and the urethane so that the adhesive bond is weakened.

SUMMARY OF THE INVENTION

It is an object of the present invention to provide a film adhesive which is heat activatable to bond strongly to a resin which may be deposited onto it and which will both form a barrier to the plasticizer from the resin and adhere strongly to a urethane adhesive for union to a painted surface.

To this end and in accordance with a feature of the present invention, I have provided a composite film adhesive including a layer of plasticizer resistant heat activatable resin adhesive for the resin body, which layer is in strongly adhesive relation to a layer of resin having groups providing active hydrogens for reaction with free-NCO groups to enable strong bonding by a urethane adhesive containing such NCO groups.

DRAWINGS

Reference is made to the attached drawings forming part of the disclosure in which FIG. 1 is a side view in section of a composite film according to the present inventions;

DESCRIPTION OF THE INVENTION

Figure 1:
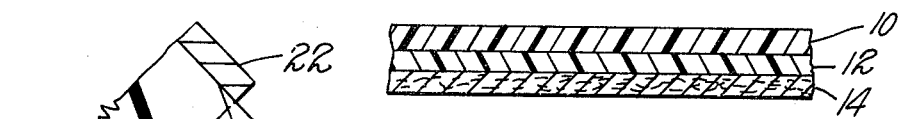
Figure 2:
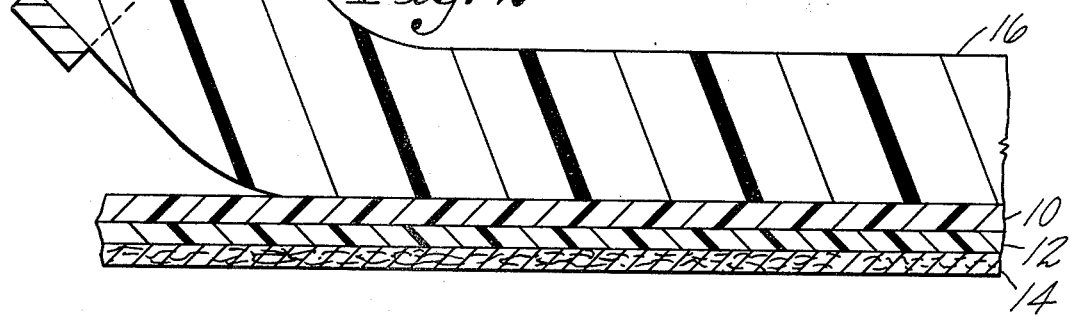
FIG. 2 is a side view in section showing the extrusion of a resin molding to join it to the composite film.
Figure 3:
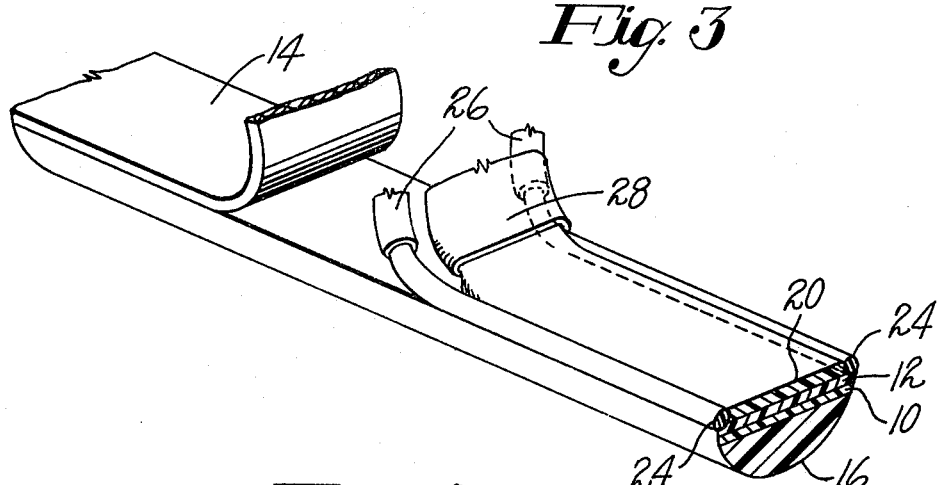
FIG. 3 is an angular view showing the deposition of pressure sensitive adhesive beads and curing type adhesive on the composite film.
Figure 4:
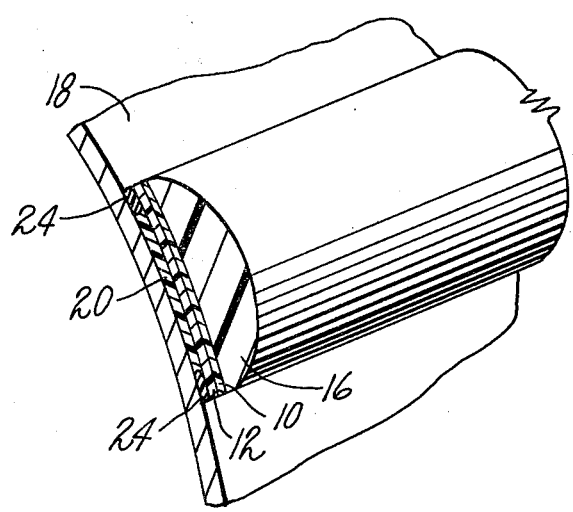
FIG. 4 is an angular view showing the assembly of plasticized resin molding on a substrate with the aid of the composite film adhesive.

The composite film adhesive of the present invention (see FIG. 1) includes a first layer 10 of a heat activatable adhesive resin resistant to passage of migratory plasticizers and a second layer 12 of resin strongly adhered to the first layer and having active hydrogens for reaction with a curing type adhesive. The composite film will normally be supplied on a release carrier sheet 14 for convenience in handling. This combination of resin layers provides the ability to form a strong bond to a plasticized resin body 16 (see FIG. 2) extruded onto the first layer in molten condition and to be bonded strongly when the assembly of resin body 16 and composite film is pressed against a substrate 18 with a layer 20 of curing adhesive (see FIGS. 3 and 4) between the second layer 12 and the substrate 18.

To secure effective union of a resin molding 16 to the first layer 10 of a strip of the composite film, it is important that there be a coordination between the temperature at which the molten resin is extruded onto the first layer 10 and the softening point and thickness of the first resin layer. That is, the molten resin is normally extruded at a temperature of about 150° C. to 205° C. and it is the heat of this resin which is relied upon to bring the resin of the first layer 10 to heat activated condition in which it will wet and bond to the applied resin body 16. However, it is also important that the resin of the first layer 10 not be displaced by the extrusion onto it of the hot molten resin. Accordingly, while it is necessary that the resin of the first layer 10 have a softening point at which it is actively adhesive below the temperature at which the resin is to be extruded onto it, it is important that the first layer 10 have a thickness such that subsurface portions of the layer are not brought to temperatures which would render them freely fluid so that these subsurface portions will resist displacement by the extruded molten resin and will remain as a barrier to passage of plasticizer from the resin.

Resins of which molded strips or other bodies may be bonded by use of the present composite film material include plasticized vinyl resins such as polymers and copolymers of vinyl chloride, vinyl acetate, maleic anhydride and so on, plasticized vinylidene chloride polymers and oil extended elastomers such as styrenebutadiene copolymer rubbers, neoprene, the so called thermoplastic synthetic rubbers and block copolymers of styrene and isoprene or butadiene.

In addition to the procedure of securing resin bodies to the composite film by extruding them onto the film in heated condition, already formed resin bodies may be secured by activating the resin layer 10 by heat, for example, by infrared lamps to bring the layer to heat softened condition in which it will wet and adhere to the resin bodies.

Resins which are preferred as the heat activatable adhesive, plasticizer-resistant layer 10 include the linear saturated polyesters and copolyesters from reaction of dicarboxylic acids and glycols, for example, terephthalates, isophthalates, azelates, sebacates, succinates and mixtures of these and the polyesters derived from lactones. Preferred polyesters and copolyesters include condensates of one or more lower alkylene glycols such as ethylene glycol or butylene glycol with one or more dicarboxylic acids. for example, condensates of 1,4-butanediol with mixed terephthalate, isophthalate and azelate or sebacate components. These polyesters are prepared by condensation to have melting points of from 90° C. to 200° C., preferably from 90° C. to 150° C. and melt viscosity values as determined using a ⅜" falling steel ball in a 25×150 mm tube at 215° C. of from 30 to 200 seconds in order that they may be softened for wetting and adhesion to the extended vinyl resin but not rendered so fluid as to be squeezed out at the edges of the strip. Other heat activatable polymeric materials having useful properties as barriers to migratory plasticizer include thermoplastic polyurethanes such as that from reaction of polybutylene adipate, diphenyl methane diisocyanate and butane diol (Estane), and crosslinkable, e.g. OH functional, acrylic resins.

Materials useful as the second layer 12 of the composite film are materials such as the phenoxy resins, polyvinyl butyral, cellulose acetate butyrate providing active hydrogens and which have a melting point sufficiently high that they are not softened or weakened by temperature conditions encountered in use. This normally means that the resin should have a melting point of at least 90° C. and preferably over 100° C. For coaction with NCO groups in the later applied urethane adhesive, these materials will have an active hydrogen content of not less than $10^{-4}$ mols of active hydrogen per gram and preferably not less than about $3.5 \times 10^{-3}$ mols of active hydrogen per gram.

Phenoxy resins useful as the second layer 12 in the composite film of the present invention are the thermoplastic polyether condensation products of substantially equimolar parts of a dihydric phenol and an epoxide containing from one to two epoxide groups having active hydrogen contents of about $3.5 \times 10^3$ mols per gram. Preferred phenoxy resins are the thermoplastic poly (monohydroxyether) reaction products of substantially equimolar parts 2,2 bis (4hydroxy phenyl)propane and epichlorhydrin. These resins have a degree of polymerization of at least 30, i.e. include at least 30 repeating units, and more preferably have a degree of polymerization of at least 80.

Reference is made to U.S. Pat. No. 3,238,087 of Mar. 3, 1966, to Norwalk et al, for a description of a procedure for making such phenoxy resin. Other high molecular weight linear thermoplastic polyether condensation products are the condensation products from reaching the initial condensate of epichlorhydrin and dihydric phenol such as bisphenol A with additional dihydric phenol as described in U.S. Pat. No. 3,177,090 Apr. 6, 1965. The resins of this patent may contain minor amounts of epoxy end groups, there being, however, a substantial excess of non-epoxy end groups over epoxy end groups.

The composite sheet may be formed in a variety of ways such as casting, extrusion or the like. A useful procedure includes the steps of forming a solution of the active hydrogen containing material such as the phenoxy resin in a volatile solvent the coating the solution onto a release sheet 14 such as a silicone treated paper, the coating being in thickness sufficient after evaporation of the solvent to give a layer 12 which is preferably from about ½ to about 3 mils dry thickness. The coating is dried by passing through an oven and thereafter a solution of the heat activatable barrier adhesive resin in a volatile solvent is spread on the layer 12 in amount such that it will form on drying a layer 10 of at least about ½ mil and preferably at least about 2 mils in dry thickness.

Any of the known volatile organic solvents for the resins may be used. Preferred solvents for polyester or copolyester resins used in the layer 10 include methylene chloride, toluol, MEK and tetrahydrofurane and mixtures of these. Solid contents of from 15 to 30% are used ordinarily and preferred application viscosities are from about 600 to about 900 cps. as determined by a Brookfield Viscometer.

Preferred solvents for phenoxy resins include cellosolve acetate, butyl acetate, xylene, MEK and mixtures of these. Solids content of solutions for forming layer 12 may be from about 25% to about 40% by weight.

After drying this last coating 10 suitably in an oven, the assembly of release paper 14 and applied coatings 10 and 12 is slit to widths suitable for the resin bodies to be joined to it.

Association of the plasticized resin body 16 and the composite adhesive film is ordinarily achieved (see FIG. 2) by extruding plasticized resin in molten condition from an extruder nozzle 22 directly onto the free surface of the heat activatable resin layer 10. The molten resin softens the surface of the adhesive resin to a condition such that the resin enters into a wetting adhesive engagement with the plasticized resin. However, by proper selection of the softening point of the adhesive resin and thickness of the adhesive resin layer 10, subsurface portions of the layer 10 spaced from its free surface remain in shape retaining condition so that the adhesive resin is not displaced.

When the plasticized resin body 16 has cooled, the release paper 14 may be stripped and a curing type resin applied to the surface of the layer 12.

In a preferred form of the invention, beads 24 of hot melt pressure sensitive adhesive are extruded from nozzles 26 on marginal portions of the layer 12 prior to or simultaneously with a deposition of the curing adhesive layer 10 from nozzle 28. The pressure sensitive adhesive beads 24 serve the dual function of restraining lateral spreading of the applied curing type adhesive layer 20 and also act to hold the assembly of resin body 16 and composite film against a surface 18 while the curing adhesive develops strength.

A curing adhesive which has been found particularly useful with the composite film adhesive is a moisture curing urethane adhesive. Many formulations of this adhesive are available and in general these adhesives are the product of reaction of a polyalkylene ether diol and poly (lower alkylene) ether triol with an excess of diisocyanate over the stoichiometric amount for reaction with active hydrogens of said diol and triol to form a branched polymer having a slight excess of free NCO groups. The polyalkylene ether diols employed in the preparation are suitable poly (lower alkylene) glycols, such as polyethylene glycol or polypropylene glycol. These polyalkylene ether diols may have a molecular weight of from about 1500 to 3000 preferably from about 2000 to 2500.

The poly (lower alkylene) ethers used in the formation of the curing material suitably have a molecular weight of from about 3500 to about 5500 preferably from about 4200 to about 4800.

The diisocyanate used in the reaction is preferably diphenylmethane 4.4' diisocyanate, hexamethylene diisocyanate or methylenebis (cyclohexane) diisocyanate but other diisocyanates, such as tolylene diisocyanate. may be used.

In addition to the reactive materials, the reaction mix will also contain catalytic agents such as tin compounds, for example, stannous octoate, lead compounds or mercuric compounds, usually in amount of from 0.001 to 3 parts per 100 parts by weight of the reactive materials. The adhesive may also contain pigments, plasticizers, or other conventional additives.

Any of the conventional hot melt pressure sensitive adhesives may be used which are compatible with the layer 12 and with the material of the surface 18 to which the composite film is to be secured. In general, these pressure sensitive adhesives will be mixtures of lower polyolefins such as polypropylene together with tackifier materials such as the synthetic resins derived from petroleum and available commercially under the names of "Wingtack," "Escorez," and "Piccotac," together with hydrocarbon oil and antioxidants.

The following examples are given to assist in understanding the invention, but it is to be understood that the invention is not limited to the particular materials, proportions or procedures of the examples.

EXAMPLE I

A phenoxy resin, i.e., the polyether condensation product "Bakelite Phenoxy Resin PKHJ" which is a thermoplastic poly(monohydroxy ether) condensate of substantially equimolar parts of 2,2 bis (4-hydroxyphenyl)propane and epichlorhydrin having the repeating unit

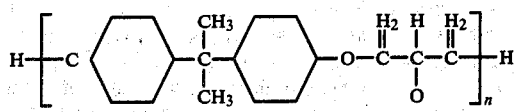

where n is about 100 and having an active hydrogen content of $3.5 \times 10^{-3}$ mols per gram and a Brookfield viscosity (40% solids in MEK) of 5000–7700 cps., is dissolved in a volatile solvent mixture of 20 parts of "Cellosolve acetate" and 11 parts of xylene to form a 29% solids solution. This solution is cast onto a silicone treated release paper in quantity to form, after drying, a film approximately 1 mil thick and the coating is dried by passing it through a two-zone oven of which the first zone is at 95° C. and the second is at 120° C.

A copolyester is prepared by reaction and condensation of 37 parts by weight of 1.4 butane diol, 21.5 parts by weight of terephthalic acid, 29 parts by weight of isophthalic acid and 8.5 parts by weight of azelaic acid, with the aid of a catalyst. The copolyester has a ball and ring softening point of 120°–130° C. and ⅜" falling steel ball viscosity at 215° C. of 50–65 seconds. 96 parts by weight of the copolyester is combined with 4 parts by weight of a saturated polyester plasticizer (Paraplex G-41) and dissolved in methylene chloride to form a 27% solids solution having a viscosity of about 750 cps. The resulting solution is coated onto the exposed surface of the phenoxy resin layer in quantity to form a thickness after drying of 2 mils and the coating is dried by passing through a two-zone oven of which the first zone is at a temperature of 32° C. and the second zone is at a temperature of 44° C.

The combined release paper and applied coatings is then slit to form strips of ¾" width. A strip of the resin layers on release paper is then passed beneath an extruder which deposits a ¼" thick molding of polyvinyl chloride resin containing DOP plasticizer in molten condition at a temperature of about 175° C. on the free surface of the copolyester layer. The heat of the polyvinyl chloride resin brings the surface portions of the copolyester resin layer to softened adhesive condition in which it unites with the applied molten resin and forms, after cooling, a strong adhesive bond.

The release paper is then stripped from the phenoxy resin layer and the assembly of polyvinyl chloride and resin layers is passed through an extrusion device which deposits beads of hot melt pressure sensitive adhesive on marginal side portions of the phenoxy resin layer and deposits a moisture curing urethane adhesive on the space between the beads of pressure sensitive adhesive. The beads of pressure sensitive resin and the coating of urethane adhesive are about 2 mm thick. In this extrusion, the beads of pressure sensitive adhesive serve to retain the moisture curing adhesive from spreading beyond the edges of phenoxy resin layer.

The pressure sensitive adhesive is a blend of about 55 parts by weight of a polypropylene, about 35 parts by weight of a tackifier resin derived from petroleum, about 10 parts by weight of petroleum oil fraction supplied for use as a rubber extending oil and one part by weight of an antioxidant.

The moisture curing urethane adhesive is based on an —NCO terminated prepolymer from reaction and condensation of about 7 parts by weight of diphenylmethane 4.4' diisocyanate, about 27 parts by weight of polypropylene glycol having a molecular weight of about 2000 and about 12 parts be weight of polyalkylene ether triol. The reaction and condensation is effected with the aid of a catalyst mixture of stannous octoate and diphenyl mercury. The prepolymer is blended with about 18.5 parts by weight of DOP, about 18.5 parts be weight of furnace black, about 13 parts by weight of thermal black and about 3 parts by weight of 50:50 mixture of toluene and MEK.

The resulting assembly is laid against a painted metal surface with the pressure sensitive adhesive beads holding the assembly in place and with the moisture curing urethane adhesive in wetting engagement in the painted surface. After 24 hours, the assembly is held in place so firmly it cannot be removed without destruction of the polyvinyl molding.

EXAMPLE II

The procedure of Example I is repeated except that a solution of cellulose acetate butyrate is used in place of the solution of phenoxy resin. The cellulose acetate butyrate has a butyral content of 37%, an acetyl content of 13.5% and an active hydrogen content of $9 \times 10^{-4}$ mols per gram. The coating solution used is a 25% by weight solids solution in MEK and a coating of 6 mils wet thickness is laid down. The coating is dried by passing it through a two zone oven of which the first zone is at 57° C. and the second at 65° C.

The remaining steps of the procedure as outlined in Example I are followed and after adhesive bonding of the assembly to a painted metal surface and holding for 24 hours, a firm bond is established between the polyvinyl molding and the painted surface.

EXAMPLE III

The procedure of Example I is repeated except that a 20% by weight solids solution of polyvinyl butyral in a 60-40 mixture of toluol and ethanol is used in place of the phenoxy resin solution and the drying oven temperatures are 57° C. and 74° C. The polyvinyl butyral resin has a butyral content of 80% calculated as polyvinyl butyral, an acetate content of 0.5% calculated as polyvinyl acetate and a hydroxyl content of 19% calculated as polyvinyl alcohol. The polyvinyl butyral has an average molecular weight of about 40,000, and the solution is put down as a coating having a wet thickness of 8 mils which gives after drying a dry coating of 1 mil thickness.

After the following the remaining steps of the procedure, it is found that a firm bond is established between the polyvinyl molding and the painted surface.

Having thus described my invention, what I claim and desire to secure by Letters Petent of the United States is:

1. Composite film adhesive comprising a layer of heat activatable adhesive for adhesion to a plasticized resin which adhesive is resistant to plasticizer migrating from said resin and a layer of tough flexible resin for adhesion to a urethane adhesive layer and in strongly adhesive intimate relation to said heat activatable adhesive layer, said tough flexible resin containing at least $10^{-4}$ mol of active hydrogen per gram of tough flexible resin for reaction with free NCO groups of a urethan adhesive.

2. Composite film adhesive as defined in claim I, in which said tough flexible resin is a member of the group consisting of cellulose acetate butyrate, polyvinyl butyral and thermoplastic polyether condensation product of substantially equimolar parts of 2,2bis (4-hydroxyl phenyl) propane and epichlorohydrin, there being a substantial excess of non-epoxy end groups over any epoxy end groups on said reaction product.

3. Composite film adhesive as defined in claim 2 in which said tough flexible resin is a thermoplastic polyether condensation product of substantially equimolar parts of 2,2-bis (4-hydroxy phenyl) propane and epichlorohydrin, there being a substantial excess of non-epoxy end groups over any epoxy end groups on said reaction product, said condensation product having an active hydrogen content of at least $3.5 \times 10^{-3}$.

4. Composite film adhesive as defined in claim 3 in which said heat activatable adhesive is a linear saturated polyester resin capable, when activated, of wetting and adhering to platicized vinyl resin and having a heat activation temperature below the hot melt extrusion temperature of said vinyl resin.

5. Composite film adhesive as defined in claim 4 in which said polyester resin has a melting point of from about 90° C. to about 200° C. and said layer of polyester resin has a thickness selectively related to the heat conductivity of the polyester resin to provide a polyester layer in which sub-surface portions can resist displacement and remain in shape retaining condition when a molten plasticized resin is extruded on said polyester resin layer.

6. Composite film adhesive as defined in claim 2 in which said heat activatable adhesive layer is at least about ½ mil in thickness.

7. Composite film adhesive as defined in claim 5 in which said layer of polyester resin adhesive has a thickness of at least about 2 mils.

8. Composite film adhesive as defined in claim 1 in which said tough flexible resin layer is associated in separable relationship with a release sheet carrier.

9. Composite film adhesive as defined in claim 2 in which said tough flexible resin layer is associated in separable relationship with a release sheet carrier.

10. Composite film adhesive as defined in claim 6 in which said tough flexible resin layer is associated in separable relationship with a release sheet carrier.

11. Assembly for decoration of a surface comprising a plasticized resin body adhesively secured to a layer of heat activatable adhesive resistant to plasticizer migration from said molded resin body, a layer of tough flexible resin for adhesion to a urethane adhesive layer and in strong adhesive intimate relation to said heat activatable adhesive layer, said tough flexible resin having at least $10^{-4}$ mol of active hydrogen per gram of said tough flexible resin for reaction with free NCO groups of a urethane adhesive, beads of pressure sensitive adhesive along marginal portions of said layer of tough flexible resin on its surface opposite said heat activatable adhesive layer and a layer of moisture curing urethane adhesive containing free NCO groups on the surface of said layer of tough flexible adhesive between said beads of pressure sensitive adhesive.

12. Assembly for decoration of a surface as defined in claim 11, in which said tough flexible resin is a member of the group consisting of cellulose acetate butyrate, polyvinyl butyral and thermoplastic polyether condensation product of substantially equimolar parts of 2,2-bis (4-hydroxyl phenyl) propane and epichlorohydrin, there being a substantial excess of non-epoxy end groups over any epoxy end groups on said reaction product.

13. Assembly for decoration of a surface as defined in claim 12, in which said tough flexible resin is thermoplastic polyether condensation product of substantially equimolar parts of 2,2-bis (4-hydroxyl phenyl) propane and epichlorohydrin, there being a substantial excess of non-epoxy end groups over any epoxy end groups on said reaction product, said condensation product having an active hydrogen content of at least $3.5 \times 10^{-3}$ and in which said heat activatable adhesive is a linear saturated polyester resin.

14. Assembly for decoration of a surface as defined in claim 13 in which said pressure sensitive adhesive is a mixture of a lower polyolefin with tackifier material derived from petroleum and in which the urethane adhesive is the product of reaction of a polyalkylene ether diol and poly (lower alkylene) ether triol with an excess of diisocyanate over the stoichiometric amount for reaction with the active hydrogen of said diol and triol.

* * * * *